United States Patent [19]
Ischdonat et al.

[11] Patent Number: 6,072,578
[45] Date of Patent: Jun. 6, 2000

[54] SPECTROSCOPIC PROCESS AND SUITABLE SPECTROMETER THEREFOR

[76] Inventors: Thomas Ischdonat, Ungarnstrasse 18, D-52070 Aachen; Ursula Schumacher-Hamedat, Am Trivoli 24, D-52070 Aachen; Thomas Husemann, Eifelstrasse 3, D-52068 Aachen, all of Germany

[21] Appl. No.: 08/945,332

[22] PCT Filed: Apr. 16, 1996

[86] PCT No.: PCT/DE96/00662

§ 371 Date: Feb. 23, 1998

§ 102(e) Date: Feb. 23, 1998

[87] PCT Pub. No.: WO96/34257

PCT Pub. Date: Oct. 31, 1996

[30] Foreign Application Priority Data

Apr. 24, 1995 [DE] Germany .......................... 195 14 439

[51] Int. Cl.$^7$ ...................................................... G01J 3/42
[52] U.S. Cl. ................................................................ 356/325
[58] Field of Search .................................... 356/325, 319, 356/326, 324, 323, 418, 419, 308, 309, 329

[56] References Cited

U.S. PATENT DOCUMENTS 4,165,180  8/1979  Failes .
4,616,210  10/1986 Ferber et al. .
4,644,485  2/1987  Ferber et al. .
4,832,490  5/1989  Boos et al. .
5,357,343  10/1994 Lowne et al. .

Primary Examiner—K. P. Hantis
Attorney, Agent, or Firm—K. S. Cornaby

[57] ABSTRACT

The spectroscopic process uses a detector in the form of a linear array of detector units made of a photoconductive semiconductor material, wherein a radiation sample is broken down into its spectrum; the spectrum thus obtained is used to illuminate the detector and is evaluated making use of the dependence of the conductivity of the semiconductor material on the radiation intensity; the beam path between the sample and the detector is periodically interrupted by a chopper to generate dark and bright phases; when at least one measuring cycle is conducted, a measuring cycle is determined during both the dark and bright phases in one measuring period, and the intensity of the radiation impinging on the detector in the bright phase is found from the comparison between the dark phase and light phase; the interruptions in the radiation and the measuring periods are mutually synchronized so a measuring period lies either within a bright or within a dark phase, with the measuring period being variable and adjustable.

10 Claims, 1 Drawing Sheet

SPECTROSCOPIC PROCESS AND SUITABLE SPECTROMETER THEREFOR

BACKGROUND OF THE INVENTION

The present invention relates to a spectroscopy procedure, which is especially suitable for the near-infrared (IR). From the U.S. Pat. No. 4,158,505 a spectroscopy procedure is known, which uses a detector made of a photoconductive semiconductor material. With this procedure, the radiation deriving from a sample is limited like a channel, analyzed in a spectral manner and the detector is illuminated with the spectrum received in the above mentioned way and by using the dependency of the conductivity of the semiconductor material evaluated by the intensity of radiation, to produce phases of brightness and phases of darkness, the path of the rays is periodically interrupted between the sample and the detector via a chopper, at least one measurement cycle is performed and the measured values of a quantity to be measured, being clearly dependent of the conductivity of the detector, are determined during the phase of darkness as well as during the phase of brightness.

It is known that photoconductive semiconductors are used as detector material in spectrometers by using the dependency of their conductivity value of the incident beams. Thereby such a detector (photoresistor) is generally exposed to a direct voltage in combination with a capacitor, whereby then the capacitor is charged to a certain level depending on the intensity of the incident beams and the gate time. The voltage which can be calipered at the capacitor after the gate time represents the quantity to be measured.

The infrared spectroscopy is used preferably with the detection and quantitative determination of components in gaseous, liquid and solid material, whereby the interaction of the used IR-radiation with the colloidal movement of the molecules of the desired components is used for the analysis. This kind of interaction is at a maximum at a spectral range of about 1.5 $\mu$m to 2.5 $\mu$m, as the respective frequency of radiation coincides with the typical frequency of the combined vibration and the first overtone vibrations.

At the present time, as covering this spectral range, photoconductive semiconductor materials PbS and PbSe are known. When using such photoresistors in the spectroscopy, problems may occur due to two reasons, especially. On one hand the conductivity of such materials is depending on the temperature in a sensitive way. That is why the photoresistors are generally kept at a fairly constant temperature of slightly under 0° C. for example via Peltier cooling, whereby a temperature drift at the detector element cannot be excluded, however. On the other hand, the charge carriers, produced by the radiation, cannot be recombined by a simple short-circuiting of the photoresistors, that is why the photoresistors possess a „memory" for the state of the pre-exposure. From the latter it can be concluded that the same luminous intensity can produce different conductivity values depending on the state of the pre-exposure with the same detector.

To avoid the influence of the state of the pre-exposure, the radiation, hitting a photoconductive detector of the semiconductor, can be interrupted in a periodic electronic or mechanic way, so that alternately phases of brightness and phases of darkness occur. The phase of darkness serves hereby the purpose of a regular production of a reference ground level state.

It is known that for the periodical interruption of the radiation, mechanical choppers with a constant frequency of rotation are used. At the same time with the periodic interruption of the radiation, the detectors are selected with the known procedure with a frequency, which is higher by a multiple. Thereby a number of measurements within a phase of darkness is received, a further number received in the interim state between the phase of darkness and the phase of brightness as well as a number of measurements in the phase of brightness and so on, so that given several rotations of the chopper, the result is an undulated profile of the measured values. By comparing the quantities to be measured in the phase of brightness with those in the phase of darkness, the intensity of the radiation, which meets the detector, can be determined.

This procedure has the disadvantage especially in that a measurement over several phases of brightness and phases of darkness has to be performed for the determination of the desired quantity to be measured. The accuracy of measurement is increased by the number of measurements performed. That way the speed of the known procedure is limited because of the high amount of measurements for the determination of the intensity of the radiation. Changes of the intensity of the radiation within a time frame of several individual measurements cannot be detected accordingly.

BRIEF SUMMARY OF THE INVENTION

It is the task of the present invention to provide a procedure of the above mentioned kind, which on one hand drastically reduces the influence of a temperature drift of the detector element on the measurements and on the other hand enables a high speed of the measurement.

This task in solved by the procedure of the above mentioned kind by A procedure for a spectroscopy by using a detector in the shape of a linear array of detector elements, which are produced of a photoconductive semiconductor material, whereby the radiation deriving from a sample is limited like an opening, is analyzed in a spectral way, and the detector is illuminated with the spectrum received in such a way and evaluated by using the dependency of the conductivity of the semiconductor material of the intensity of the radiation; for producing phases of darkness and phases of brightness, the path of the rays is periodically interrupted between the sample and the detector by means of a chopper; at least one measuring cycle is performed, whereby the measuring cycle consists of a measurement of a complete spectrum in a phase of brightness and a complete spectrum in a neighboring phase of darkness and the measured values of a quantity to be measured, definitely dependent on the conductivity of the detector element of the detector, during the phase of darkness as well as during the phase of brightness are determined in a gate time each; from the comparison of the measured values determined in a phase of brightness and those measured values determined in a phase of darkness, the intensity of the radiation, meeting the detector in a phase of brightness; the interruption of the radiation and the gate times are synchronized to each other in such a way that a gate time lies only either within a phase of brightness or only within a phase of darkness; and the gate time is variable and adjustable, the interruption of the path of the rays is regulated in dependency to the gate time and a spectrum is only evaluated, when the synchronization of the phases of the chopper is guaranteed with the gate times, furthermore the task is solved according to the device by a spectrometer For the processing of the procedure with a spectral unit for the spectral analysis of the radiation deriving from a sample; a detector in the shape of a linear array of detector elements, which are produced of a photoconductive semiconductor material; a mechanical chopper positioned between sample and detector, periodically interrupting the path of the rays and therefore producing phases of brightness and darkness on the detector; and a phase and a frequency of the chopper as well as the start and the end of a control electronics device, dictated for each gate time, which is structured in such a way that the gate time is variable and adjustable, the interruption of the path of the rays is regulated in dependency to the gate time and a spectrum is only evaluated, when the synchronization of the phases of the chopper is guaranteed with the gate time.

Such a synchronization leads to the fact that no gate times exist, which for example start in the phase of brightness and finish in the phase of darkness. That way the possibility arises to compare pure measurements of the phases of brightness with the measurements of the phases of darkness. As the phase of darkness creates a ground level state in a detector element, the intensity of the radiation meeting the detector element in the phase of brightness can be directly determined by the comparison of the quantity to be measured determined in the phase of darkness with the quantity to be measured determined in the phase of brightness, following directly. Thereby with each phase of brightness a complete measurements is completed, whereby measurements with a very high frequency can be performed. Hereby fluctuations in the intensity of the radiation can also be determined, which occur between two consecutive phases of brightness. Furthermore the sensitivity of the procedure against a temperature drift of the detector element is drastically reduced.

The procedure according to the invention can also be performed in such a way that each gate time starts the earliest after a certain initial spare time frame has run out after the phases of brightness or darkness respectively has set in and at the latest before a certain final spare time frame before the end of the phases of brightness or darkness respectively has finished.

Thereby it is secured that the measurement are not influenced by the luminous states at the transfer between the phase of brightness and of darkness or between the phase of darkness and brightness. The start and the end of a phase of darkness or brightness respectively can be defined by means of a certain position of the chopper or any other interrupting device of the radiation, whereby a phase of brightness follows directly after a phase of darkness and vice versa.

The procedure according to the invention can also be performed in such a way that for the synchronization of the interruption of the radiation with the gate times frequency and phase of the interruption of the radiation as well as start and finishing points of the gate times are given by means of a control electronics device.

The synchronization of the individual steps of the procedure are simplified by the fact that a control electronics device controlling all processes of a procedure and the points in time for the individual steps of the procedure are dictated. Because of that it can be avoided for example that the complete process of the procedure has to be adjusted to a dictated constant frequency of the interruption of the radiation.

The procedure according to the invention can also be performed in such a way that after the gate time has run out, the measured values of each detector are initially lead to a sample-and-hold part each and are stored temporarily there and the sample-and-hold parts are selected during a later gate time.

This step of the procedure is especially advantageous when using detector rows with a high amount of detector elements. Generally, if several detector elements exist, these are selected in a sequence. This procedure is time-consuming, that is why either the gate times have to be shortened or the phases of darkness and brightness have to be prolonged. To avoid this, the measured values of each detector are lead to a sample-and-hold part each at the end of the gate time. This is a temporary storage, which is uncoupled from the detector directly after having been lead to a measured value, so that the latter is again available for a further measurement at once. In the course of these further measurements, the sample-and-hold parts are selected in a sequence, whereby no loss of time occurs for the measurement.

It is advantageous, to perform the procedure of the invention in such a way that for the synchronization of the interruption of the radiation, with the gate times, frequency and phase of the interruption of the radiation as well as starting and finishing points are dictated by a control electronics device.

For the performance of the procedure according to the invention, a spectrometer with a spectral unit serves the purpose of the spectral splitting of the radiation, deriving from a sample, a detector unit, consisting of at least one photoconductive semiconductive detector element, a mechanical chopper, positioned between sample and detector unit, interrupting the path of the rays periodically and therefore producing phases of brightness and darkness on the detector unit and as well as a phase and a frequency of the chopper and also the start and the end of the control electronic device existing before each gate time.

The more the path of the rays is defined and the thinner the beam cluster, the more precise the phases of brightness and darkness can be produced by a mechanical interruption of the radiation. It is therefore advantageous, to form the spectrometer according to the invention in such a way that is has a fiber-optic light guide, leading the path of the rays, between the sample and the chopper.

The spectrometer according to the invention may also be preferably embodied in such a way that it provides an optic channel, positioned in front of the spectral unit in the path of the rays, serving as a screen. The measure of superficies of the channel are not larger than the corresponding measures of superficies of the detector elements.

Thereby the cross-sectional area of the path of the rays is limited correspondingly to the largesse of the detector element, so that a respective spectral range can be allocated to a detector element univocally.

The phase and the frequency of the chopper are controlled by the control electronics device. This can be performed by the control electronics device determining a digital sign as a reference input, at whose point in time the chopper is supposed to take a certain position. The actual position of the chopper, represents the actual value of the regulation, it may for example be determined by means of radiation, deriving from the sample. This procedure has the disadvantage though that one has to take into account with a minor quality for the measurement.

This disadvantage can be avoided, if the spectrometer according to the invention possesses a sensor element, which detects the phase of the chopper.

When using suitable materials for the chopper disks, the spectrometer according to the invention could be embodied in such a way that the sensor element is an approximation sensor.

With any materials of the chopper disks, the spectrometer of the invention can be formed in such a way that, the sensor element is a reflex light screw. Preferably, hereby a light can be used from the green visible area.

The used sensor element is attached in a misaligned way around a certain angle to the path of the rays with regard to the rotation axis of the chopper.

In the following a preferred embodiment of the spectrometer according to the invention as well as a preferred embodiment of the procedure according to the invention is illustrated with the help of the illustrations.

DETAILED DESCRIPTION OF THE DRAWINGS

Figure 1:
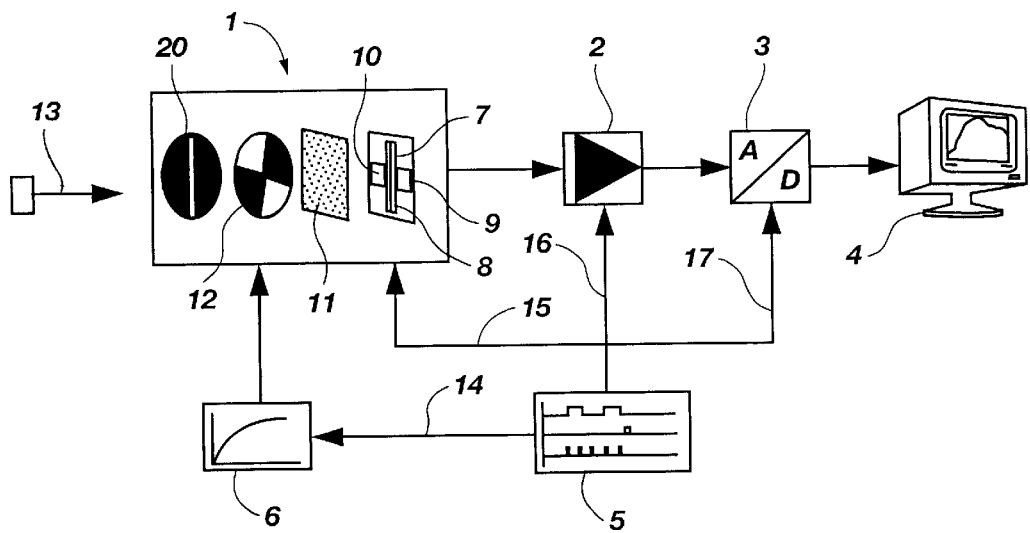
FIG. 1 a schematic illustration of the spectrometer according to the invention and FIG. 2 a diagram to the illustration of the timely course of the signals, deriving from the control electronic unit.

FIG. 1 shows a schematic illustration of the entire spectrometer with a detector, a signal-processing unit 2, an A/D transducer 3, a terminal serving the processing of measured values and the illustration of the measured results, a control electronic device 5 as well as a control unit 6 for the synchronization of the chopper.

The detector consists of two detector rows 7 and 8, in a direct row, with 32 PbS-detector elements each, not illustrated individually here in the example, which can be selected in a sequential manner via two multiplexerchips 9 and 10, each connected to a detector row 7,8, a holographic transmission grid 11 with a lattice constant of 1600 nm to 2000 nm, as well as a chopper 12, which periodically interrupts the path of the rays, indicated by the arrow 13. The path of the rays is led by a fiber-optic light guide, not illustrated here, up to an optic slit 20, which is positioned directly in front of a chopper 12. The channel limits the cross-sectional area of the light beam in such a way that the measurements of the diffraction pattern of the channel, produced at the location of the detector rows 7,8 by the transmission grid, correspond to the measurements of the detector element.

The spectral measurements are not performed absolutely, but by gaining the difference of two consecutive spectrums, which are taken alternately with and without lighting. Therefore, phase and frequency of the chopper 12 and the gate time for the taking of the spectrums have to be coordinated. This synchronization of the gate time and the phases of brightness and darkness, generated by the chopper 12, is achieved, by the control electronics device 5 making the respective timely dictation, meaning that it dictates the start and the end of the gate times as well as the frequency and the phase of the chopper 12, and that the control unit 6 regulates the path of the chopper according to these dictation. That way the chopper 12 follows the determined gate times, while the normal chopper configurations set the chopper frequency in a constant way and the gate times will have to be adjusted to them.

For the coordination of the processes of time in the spectrometer, the control electronics device 5, as indicated by the arrows 14, 15, 16, 17, sets signals, which cause certain processes in the different components of the spectrometers 2, 3, 6, 9, 10. The control electronics device consists of a central card, which is responsible for the administration of the timely dictation and which is essentially structured of two EPROM-components with 16 address—and 8 data bits each. Due to their parallel operation 216 bit states can be programmed freely, which represent the timely sequence of the digital signals of the corresponding outputs. These states are passed with a beat of 1 MHz produced internally, whereby the states are addressed in a rising manner by a counter starting with 0. One of the 16 outputs is used solely, to reset the counter to 0 at a certain point in time. The respective signal FRAME SYNC (see FIG. 2) enables a cyclic operation with an adjustable timely periodic duration. This signal can be guided outside via a data circuit together with the other 15 circuits, which can be programmed freely, for the controlling of the chopper 12, the signal processing 2 and the A/D transducer 3, so that these components can be synchronized with each other.

Figure 2:
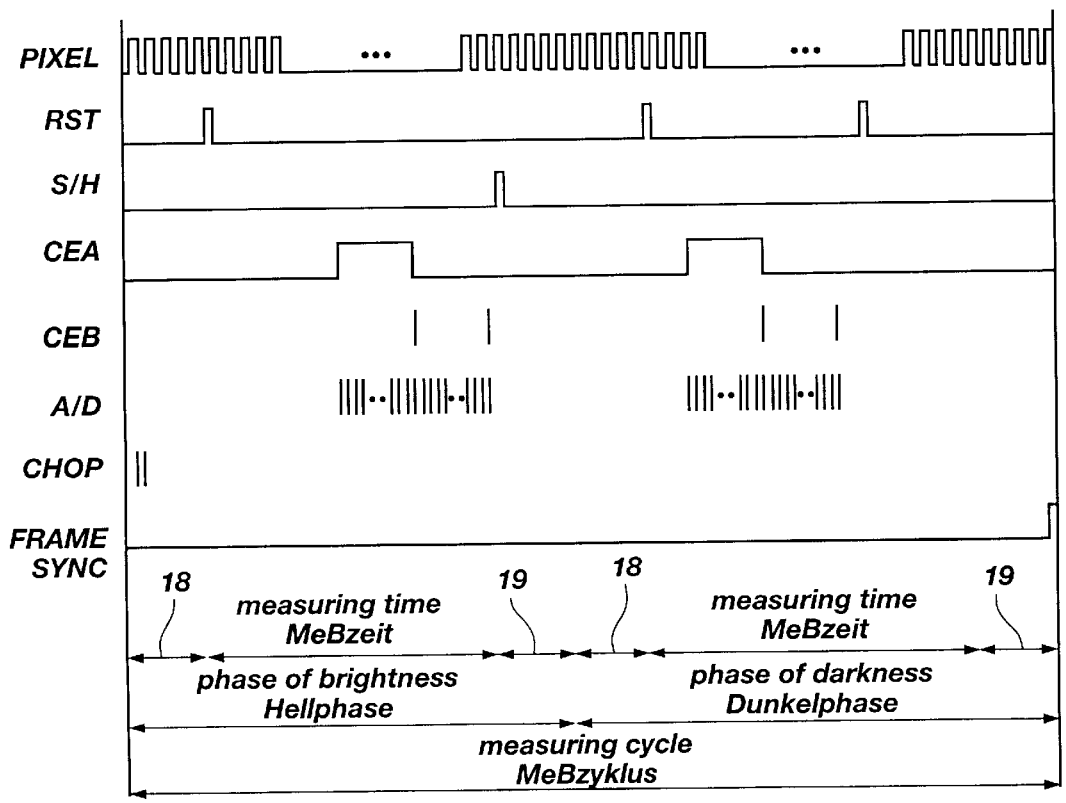

FIG. 2 illustrates an example of the timely sequence of the signals, sent out from the control electronics device. A measured cycle with the period, given by the FRAME-SYNC signal, encloses the measurement of two complete spectrums: one in the phase of brightness and one in the phase of darkness. That way sequential spectrums of phases of brightness and phases of darkness are constantly measured. The period of a measured cycle is directed towards the manner of the determination of the quantity to be measured. Normally, for the determination of an intensity of radiation, meeting an detector element, a constant voltage is feed to the detector element and during the gate time, a capacitor, switched in a row with the detector element, is charged. The charge collected there in a certain time interval is dependent on the conductivity of the detector element and thereby from the intensity of the radiation, which is met there. A gate time needs to be finished before the saturation of the capacitor is reached. In the present case gate times between 3 ms and 7 ms were chosen. A gate time always starts after an initial spare time 18 has finished after the phase of brightness or darkness has begun and it always ends before the final spare time 19 before the end of the respective phase. This guarantees especially that in the course of the gate time, the respective detector element is actually darkened or illuminated completely. Here, initial spare time 18 and final spare time 19 make up for example in about 4% of a phase of darkness or brightness together, so that a measured cycle lasts about between 6 ms and 15 ms depending on the chosen gate time. The phases of brightness and darkness are to be taken as ideal phases, which are assumed without a stationary derivation from the rule and a certain residual ripple of the chopper 12.

The chopper 12 is addressed via a signal CHOP, which serves as a reference input for the regulation of the chopper 12. If the chopper 12 runs in the transient state, then the path of the rays is opened at the point in time of the transmission of the rising edge of the CHOP signal, so that a phase of brightness begins.

The beginning of the gate time is characterized by a rising edge of a signal RST. The RST signal resets the control of the detector rows, so that a new timely integration is started via the quantities to be measured at the individual detector elements.

At the end of the gate time an S/H signal has the effect that the momentary value of the quantity to be measured of each detector element is each lead to a sample-and-hold part not illustrated here and is temporarily stored. After the quantity to be measured has been fed, the sample-and hold parts are decoupled from the corresponding detector elements, so that the latter are available for the next gate time.

With the rectangle signal PIXEL the two multiplexerchips 9, 10 are each put forward by one sample-and-hold part to the next with 250 KHz. The lift-up of the signals CEA and CEB each addresses one of the two multiplexerchips 9, 10 and has the effect that the sample-and-hold part being momentarily adjacent to the multiplexerchips 9, 10 can be selected. With the already mentioned frequency the 32 sample-and-hold parts for each detector row 7, 8 are selected in a time of 0.128 ms. This selection occurs in the phase respectively, which follows the gate time producing the measured values. After their selection the measured values are processed without delay in a measuring amplifier, not illustrated, and are in an adjacent position at the entrance of the A/D transducer in real time. The alteration of each individual measured value is set about by rising edges of the A/D signal, which again is generated by the control electronics device 5.

The dictation of the phase and the frequency of the chopper 12 via the control electronics device 5 occurs with the signal CHOP as reference input, whose rising edge defines the point in time, to which the chopper 12 is supposed to open. Thereby the frequency and the phase of the chopper 12 are definitely determined. As the actual value of the regulation of the chopper serves the signal SENSOR, which is supplied by an inductive approximation sensor not illustrated here, which is mounted in the vicinity of the chopper disk in a fixed position. The sensor is attached directly opposite the path of the rays with regard to the axis of the chopper disk. That way the phase shifting between the path of the rays and the sensor corresponds to just half a turn of the chopper disk. With an even number of channels in the chopper disk, the signal SENSOR directly reflects whether there is a phase of darkness or a phase of brightness. The chopper is controlled by means of an analogue voltage USOLL at the size of a few volts, which is put onto the opening of a suitable motor-drive-card of the chopper 12. This card itself, controls the speed of a small triphase-motor not illustrated here, at the shaft of which a chopper disk is mounted.

the reference input CHOP and the actual value SENSOR are given onto a phase comparator switch, belonging to the control unit 6, which from the rising edges of these signal produces a positive or a negative periodic rectangular signal DELTA, whose digit sign supplies the information whether the control distance, consisting of the motor-drive-card, the triphase-motor and the chopper disk runs too fast or too slow. The duty factor of the pulses is a measurement for the phase deviation. The momentary equivalent part is detected by low-pan filter and after that integrated to the regulated quantity USOLL. This principle of regulation represents the well known lagging synchronization.

The disk of the chopper is divided in two so that measured cycles are passed through in one turn of the chopper disk. To fade out the influence of mechanical process irregularities of the disk onto the regulation, a frequency divider was built at the two entrances of the control unit 6, the frequency divider serves the purpose of guaranteeing that only every second signal of the CHOP and SENSOR signals reaches the evaluation. That way the same edge of the chopper 12 is always observed.

As soon as and as long as the chopper 12 is kept in the transient state, this is signaled to the control electronics device 5 by a lift-up of a signal LOCKED. As long as this signal is not lifted up, the data transfer to the terminal 4 is stopped, so that spectrums can only be evaluated, when the synchronization of the chopper phases with the gate times is guaranteed. The signal LOCKED is received from the DELTA signal produced by the phase comparator.

We claim:

1. A procedure for a spectroscopy by using a detector which detector is a linear array of detector elements, which detector elements are produced of a photoconductive semiconductor material and which detector elements have a photoconductivity and a known dependency of this photoconductivity of the semiconductor material from the intensity of an incident irradiation; whereby radiation deriving from a sample is confined by an optical slit, then by spectral analysis in a spectral unit, a spectrum of the radiation is obtained, then the detector is illuminated with this spectrum and an output signal of the detector is produced, which output signal is evaluated using the known dependency of the photoconductivity of the semiconductor material from the intensity of the radiation; for producing phases of darkness and phases of brightness, the radiation is periodically interrupted by means of a chopper, which chopper is arranged in the path of the radiation between the sample and the detector;

at least one measuring cycle of the output signal of the detector is performed, whereby one measuring cycle consists of a measurement of a spectrum of the radiation on the detector in a phase of brightness and a spectrum of the radiation of the detector in a phase of darkness, which is neighboring to said phase of brightness, and the output signals, definitely dependent on the photoconductivity of the detector elements of the detector, during the phase of darkness as well as during the phase of brightness are monitored during a measuring time each;

the measured output signal determined in a phase of brightness and the measured output signal determined in a phase of darkness are compared and the intensity of the radiation impinging on the detector in a phase of brightness is calculated;

the period of darkness, the period of brightness and the measuring times are synchronized to each other so that a measuring time lies within a phase of brightness and a consecutive measuring time lies within a phase of darkness, which is neighboring to said phase of brightness; and the measuring time is varied, the chopper is regulated in dependency to the measuring time and an output signal for a spectrum is only taken when the chopper is synchronized with the measuring times.

2. The procedure, according to claim 1, wherein each of said measuring times is started at the earliest after an initial spare time has run out after a said phase of brightness or a said phase of darkness, respectively has begun and at the latest ends before a final spare time has begun before the end of said phase of brightness or said phase of darkness.

3. The procedure, according to claim 1, wherein for said synchronization of the chopper with the measuring times by a control electronics device frequency and phase of the chopper are determined as well as the starting and finishing points in time of the measuring times.

4. The procedure according to claim 1, whereby after a measuring time has run out, the output signal for each detector element of the detector is inputted to a sample-and-hold circuit and is stored there temporarily.

5. A spectrometer for the procedure of claim 1, comprising in combination:

the optical slit for confining the radiation received from the sample, the spectral unit for the spectral analysis of the spectrum of the radiation, the detector in the form of a linear array of detector elements, which detector elements are produced of a photoconductive semiconductor material and which detector elements have a photoconductivity and a known dependency of this photoconductivity of the semiconductor material from the intensity of an incident irradiation, whereby the detector is located where the spectrum appears and an output signal of the, detector is produced, which output signal is evaluated using the known dependency of the photoconductivity of the semiconductor material from the intensity of the radiation, the chopper for producing phases of darkness and phases of brightness on the detector, which chopper is arranged in the path of the radiation between the sample and the detector and periodically interrupts the radiation, a control electronics device is provided for controlling phase and frequency of the chopper, as well as start and end of the measuring times, whereby the control electronics device has means for varying and adjusting the measuring time and has means for regulating the chopper in dependency of the measuring time and a spectrum is only evaluated, when the chopper is synchronized with the measuring times.

6. The spectrometer, according to claim 5, wherein the optical slit has an area which is not larger than the respective area of the surface of the detector.

7. The spectrometer, according to claim 5, wherein a sensor element is provided for determining the phase of the chopper, which sensor element is one of an inductive approximation sensor and a reflex light barrier.

8. The spectrometer, according to claim 5, wherein the photoconductive semiconductor material is one of PbS and PbSe.

9. The spectrometer, according to claim 5, wherein at least one mulitplexer is provided, which multiplexer serves the purpose of a sequential reading of the measured output signals of the individual detector elements of the detector.

10. The spectrometer, according to claim 5, wherein each detector element of the detector is allocated to a sample-and-hold circuit, serving the temporary storage of an output signal.

* * * * *